United States Patent [19]

Del Signore, II

[11] Patent Number: 4,833,375

[45] Date of Patent: May 23, 1989

[54] DIGITAL MOTOR CONTROL SYSTEM

[75] Inventor: James R. Del Signore, II, Trumansburg, N.Y.

[73] Assignee: NCR Corporation, Dayton, Ohio

[21] Appl. No.: 173,387

[22] Filed: Mar. 25, 1988

[51] Int. Cl.[4] .............................................. H02P 5/00
[52] U.S. Cl. ................................... 318/269; 318/365; 388/810; 388/910; 388/912; 388/921
[58] Field of Search ................................ 318/362–369, 318/280–286, 599–601, 603, 53–55, 302–304, 306–312, 329, 332

[56] References Cited

U.S. PATENT DOCUMENTS

| | | | |
|---|---|---|---|
| 3,495,151 | 2/1970 | Hutner | 318/284 |
| 3,532,953 | 10/1970 | Daab et al. | 318/362 |
| 4,185,337 | 11/1984 | Sandusky | 318/314 |
| 4,204,777 | 5/1980 | Jen | 400/124 |
| 4,208,137 | 6/1980 | Liu | 400/124 |
| 4,280,082 | 7/1981 | Acharya et al. | 318/341 |
| 4,293,233 | 10/1981 | Hoffman | 400/144.2 |
| 4,373,149 | 2/1983 | Coste | 318/281 |
| 4,468,863 | 2/1986 | Ruof | 318/269 |
| 4,482,850 | 11/1984 | Sonoda et al. | 318/606 |
| 4,491,904 | 1/1985 | Horinchi et al. | 364/130 |
| 4,523,134 | 6/1985 | Kinoshita et al. | 318/313 |
| 4,599,545 | 7/1986 | Moriki et al. | 318/314 |
| 4,691,150 | 9/1987 | Jen | 318/331 |
| 4,712,113 | 12/1987 | Brooks et al. | 346/1.1 |

FOREIGN PATENT DOCUMENTS 58-15473 7/1981 Japan .

OTHER PUBLICATIONS

U.S. patent application Ser. No. 173,386, filed Mar. 25, 1988, inventor James R. Del Signore II, assigned to NCR Corporation.

Primary Examiner—William M. Shoop, Jr.
Assistant Examiner—David Martin
Attorney, Agent, or Firm—Wilbert Hawk, Jr.; Albert L. Sessler, Jr.

[57] ABSTRACT

A digital motor control system includes a flip-flop latch for receiving motor circuit drive data from a microprocessor, a counter for counting to a predetermined value representing the total duration of a motor drive pulse, a comparator for comparing the incrementing counter value with the motor circuit drive data stored in the latch to provide a pulse width modulated signal, delay circuitry for preventing overlapping of motor brake and motor drive signals, a drive gate controlled in part by said pulse width modulated signal for applying a drive signal for motor control, and a brake gate for applying a brake signal for motor control.

14 Claims, 5 Drawing Sheets

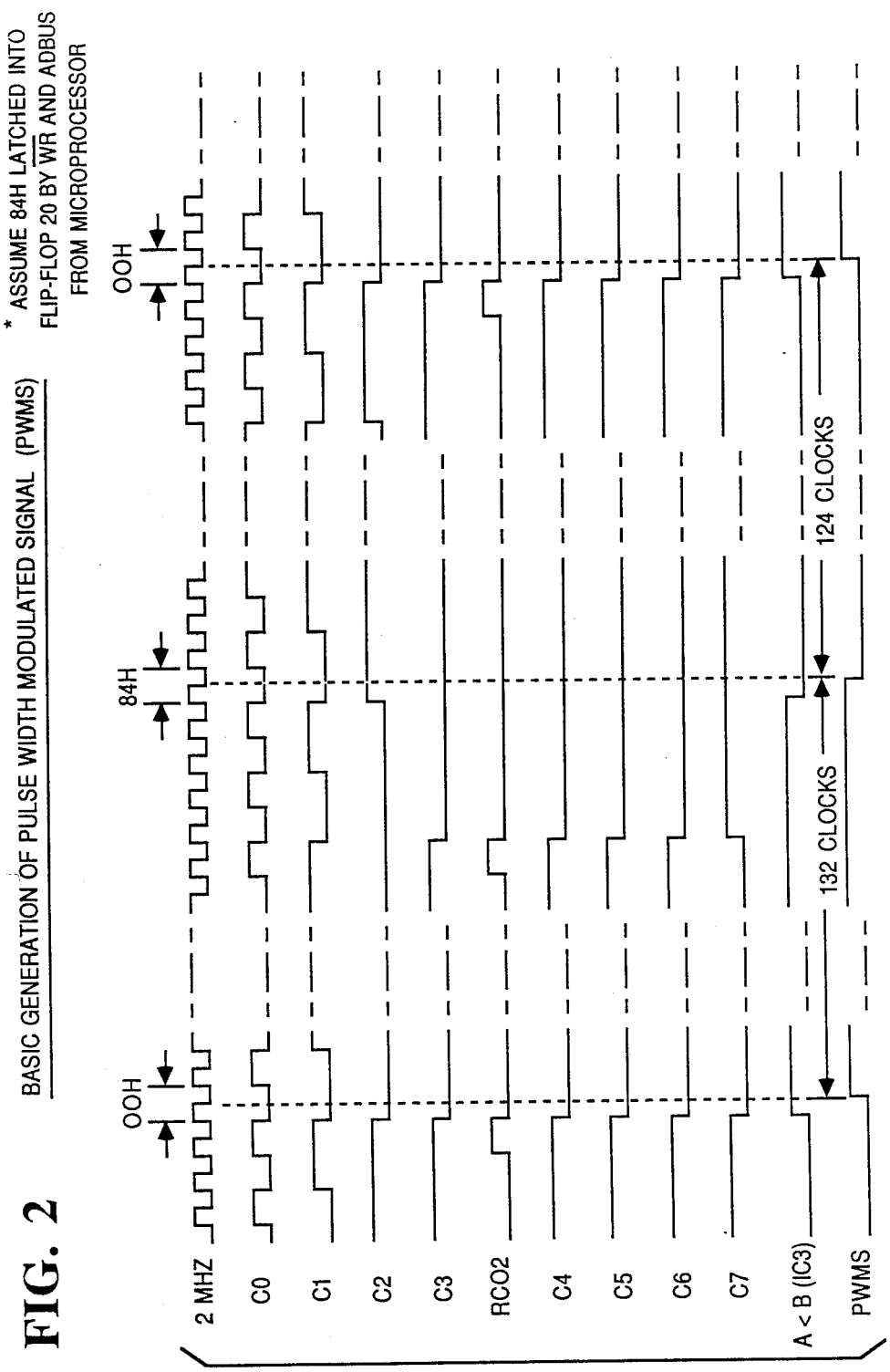
FIG. 2  BASIC GENERATION OF PULSE WIDTH MODULATED SIGNAL (PWMS)

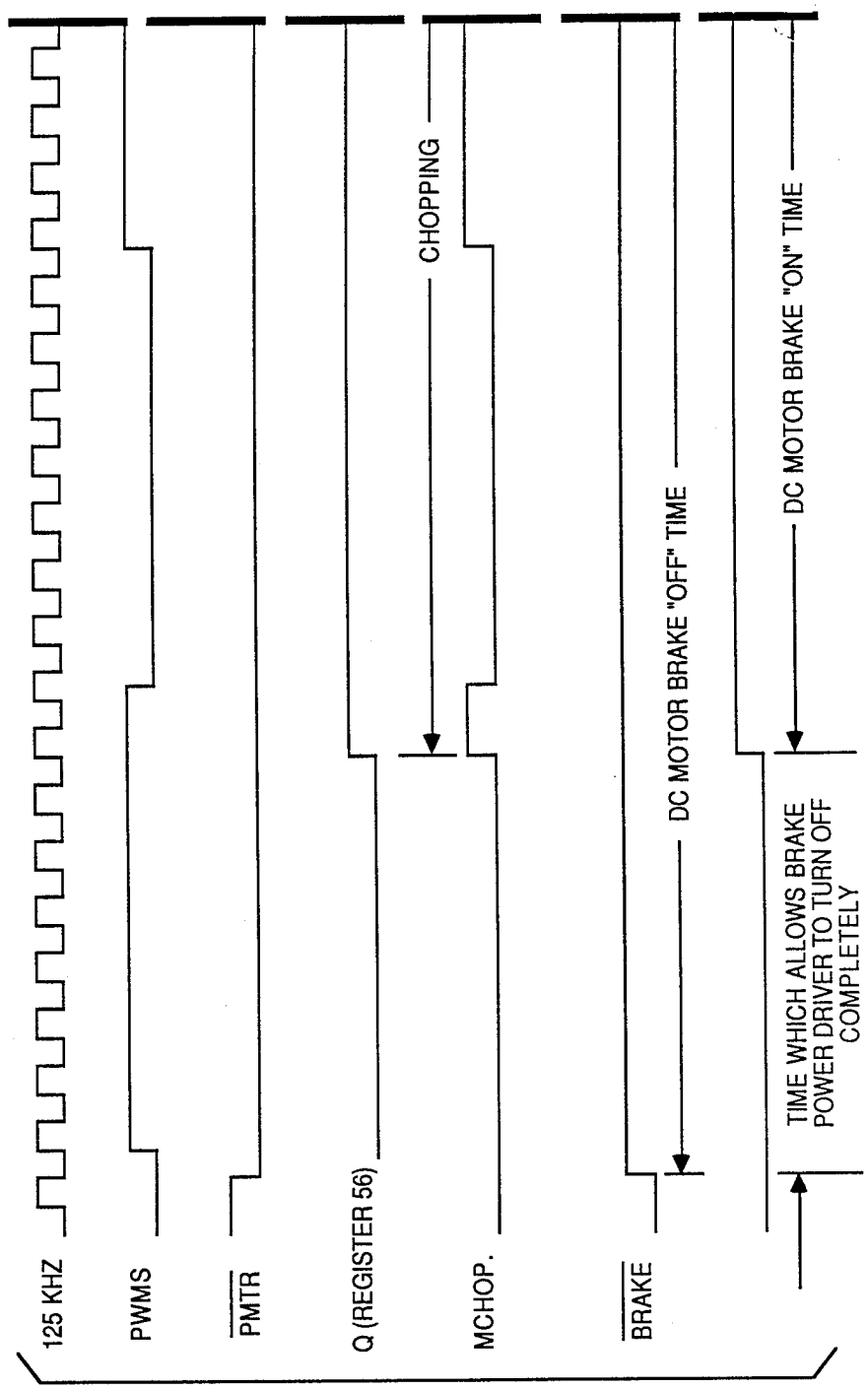

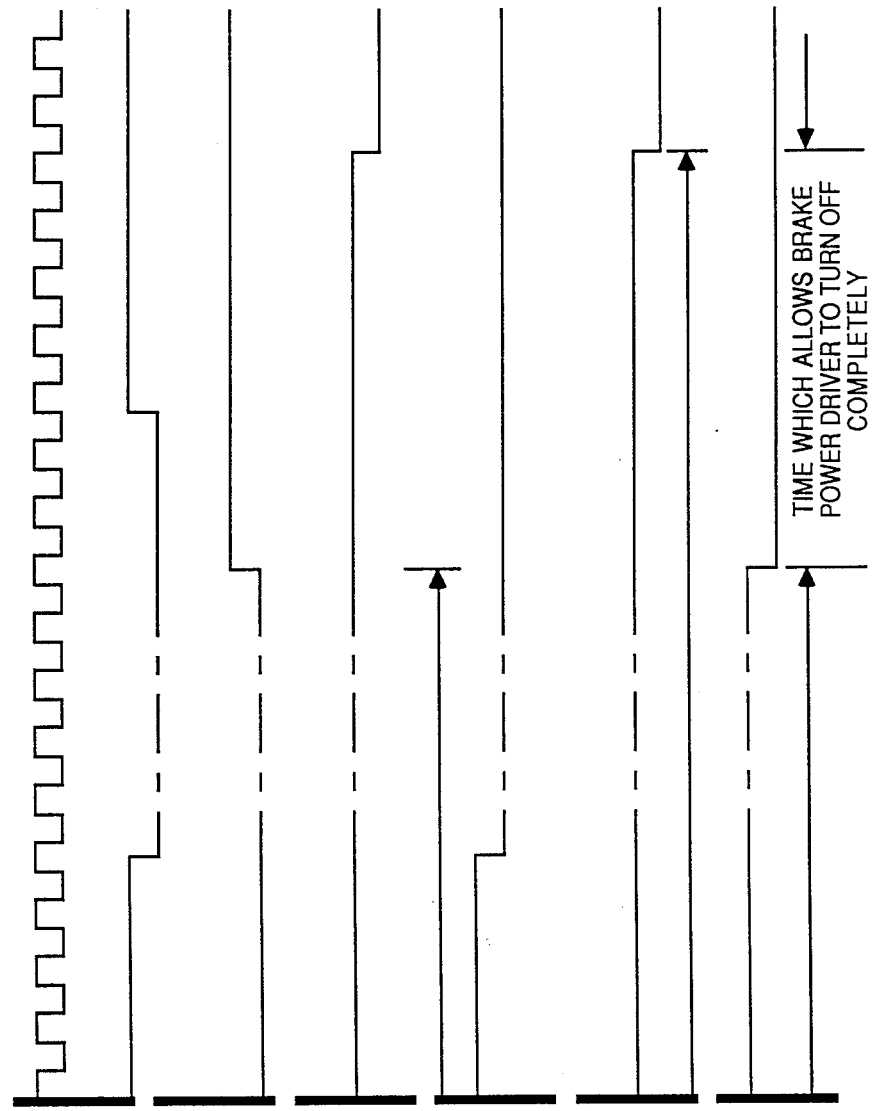

DIGITAL MOTOR CONTROL SYSTEM

CROSS REFERENCE TO RELATED APPLICATION

Digital Printhead Energy Control System, copending application, U.S. Ser. No. 173,386, filed on even date herewith, invented by James R. Del Signore, II, assigned to NCR Corporation.

BACKGROUND OF THE INVENTION

In the field of matrix printers, a printer may include one or more printheads which are caused to be moved in a reciprocating manner across the printer for printing in a serial number. The printhead may be moved by a cable and pulley arrangement, a lead screw, or a cam drive or like drive mechanism. Each of the printheads includes a plurality of elements supported in a group and actuated or energized at high speed to cause printing of dots by the movement of dot-making elements, including droplets of ink or by the movement of print wires attached to solenoids which are caused to be impacted against the paper. The print wires or ink jet nozzles are usually spaced vertically so as to print the dots making up the characters in a line as the printhead is moved across the printer. In this manner, a line of printed characters is completed upon travel of the printhead in one direction across the paper.

Another form of matrix printer includes the use of a plurality of printing elements supported from a carriage in a manner wherein the elements are aligned horizontally across the printer and upon each pass of the carriage respective dots of characters are printed in a line or row and subsequent passes of the carriage and printing elements cause additional lines of dots to be printed to complete the dot matrix characters along the line of printing. Common arrangements include the use of four or eight printing elements supported from the carriage.

A timing strip with slots or like indicia is commonly used to originate the actuation of the printing elements wherein one or more sensors sense the slots or other indicia to prints dots in precise columns across the paper. While the printing is frequently performed in one direction, for example, left to right, the printing can also be done in both directions of travel of the printhead carriage or of the printing element carriage.

The speed of a DC motor driving a printhead influences the location of each print dot that forms a matrix of dots creating a character. The DC motor's speed is in turn influenced by the amount of torque applied to the motor'output shaft, the temperature, the humidity, mechanical wear and other miscellaneous factors. Motor speed controllers are used to attempt to maintain the speed of the DC motor at a relative constant to insure quality printing, but it has been determined that speed controllers generally can only control speed within a limited range and when the loading on the motor exceeds this range, the motor's speed is not accurately controlled.

It is accordingly desirable to have a motor speed controller which can accommodate a shift in loading range of a motor so as to maintain the motor's speed substantially constant.

State-of-the-art circuitry commonly uses analog closed loop or open loop control circuits to operate DC motors at a constant angular velocity regardless of torque load. Usually torque current or encoded shaft velocity is fed back into the control circuit to adjust DC motor shaft speed for constant angular velocity. Such analog circuits are not applicable to large scale integration with other digital type of circuits found in a microprocessor environment. For economy and efficiency of operation, it would be desirable to provide motor control circuitry which employs digital components applicable to large scale integration (LSI).

SUMMARY OF THE INVENTION

The present invention relates to a digital motor control system and more particularly relates to a system for controlling applied DC motor control voltage by pulse modulation and for furnishing delays in transitions from motor drive operation to motor brake operation and vice versa in order to prevent destructive current spikes in power drive circuits.

In accordance with one embodiment of the invention, a digital motor control system comprises: clock signals means storage means for receiving digital motor operation data; latch means coupled to such storage means for receiving and retaining said digital motor operation data; counter means controlled by said clock signal means for counting incrementally from a first digital value to a second value and then returning to said first digital value; digital comparator means coupled to said latch means and to said counter means for comparing the digital value of data stored in said latch means with the digital value stored in said counter means and for providing a output signal on an output thereof when a predetermined relationship occurs between said latch means data value and said counter value; shift means coupled to said clock signal means and said comparator means for time-shifting the output signal from the comparator means; microprocessor means for producing a motor drive signal; motor drive control means coupled to said microprocessor means; reset control means; delay means coupled to said motor drive control means for producing a delayed output signal; first gating means coupled to said shift means, said motor drive control means, and said delay means for controlling said motor drive control signal; and second gating means coupled to said reset control means, said motor drive control means, and said delay means for producing a brake signal which is delayed a predetermined amount in commencing until after a preceding motor drive signal has terminated, said motor drive signal means being delayed a predetermined amount in commencing until after a preceding brake signal has terminated.

It is accordingly an object of the present invention to provide a efficient digital motor control system.

Another object is to provide a system for controlling applied DC motor voltage by pulse modulation and for furnishing delays in transitions from motor drive operation to brake operation and vice versa in order to prevent destructive current spikes in power drive circuits.

Another object is to provide a motor control system having digital components which are applicable to large scale integration with other digital type circuits.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 2 is a diagrammatic representation of the wave forms of certain signals associated with the system of FIGS. 1A and 1B.

FIGS. 3A and 3B, taken together, constitute a diagrammatic representation of the wave forms of certain additional signals associated with the system of FIGS. 1A and 1B.

DESCRIPTION OF THE PREFERRED EMBODIMENT

Figure 1A:
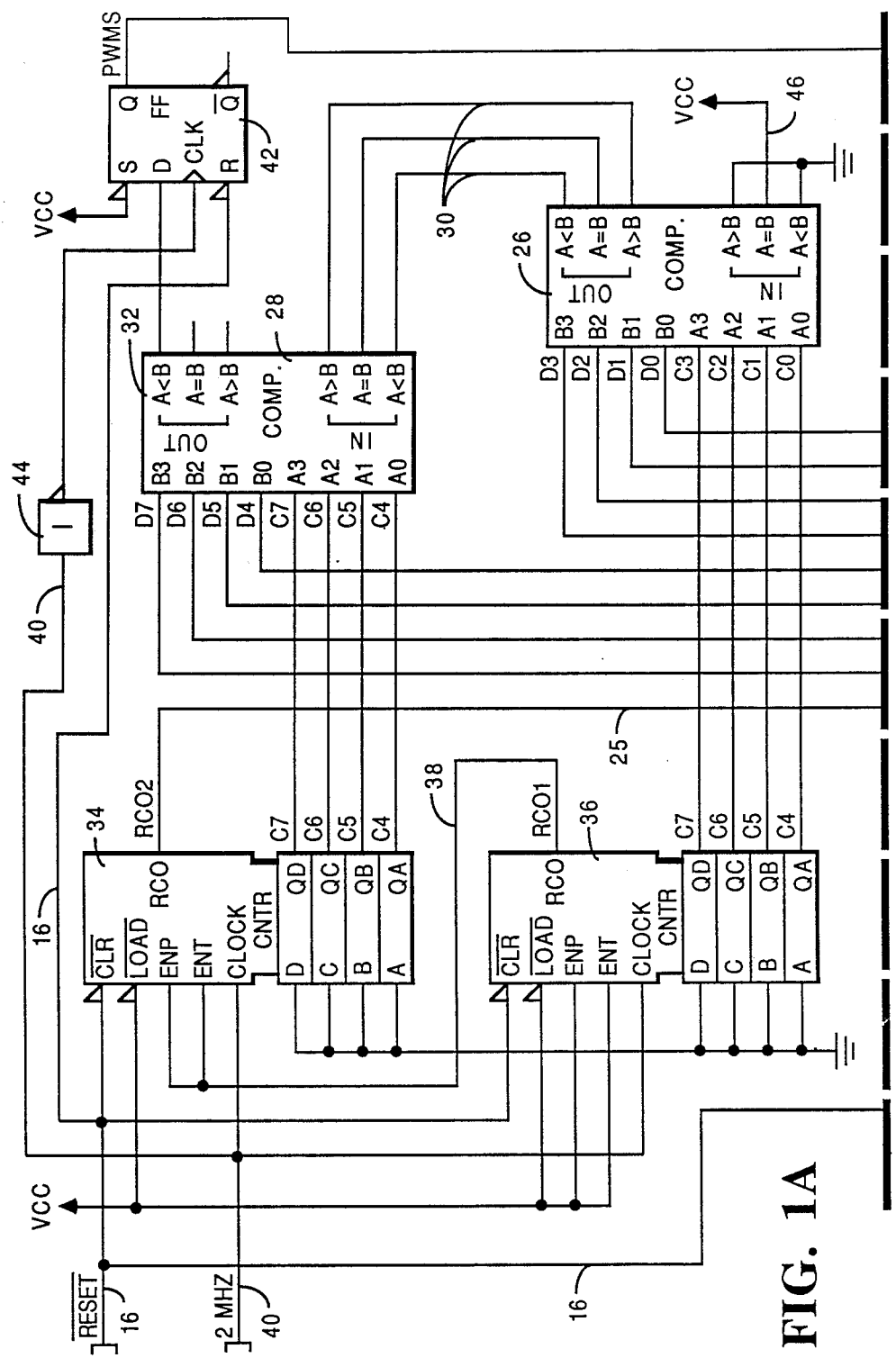
FIGS. 1A and 1B, taken together, constitute a circuit diagram of the motor control system of the present invention.
Figure 1B:
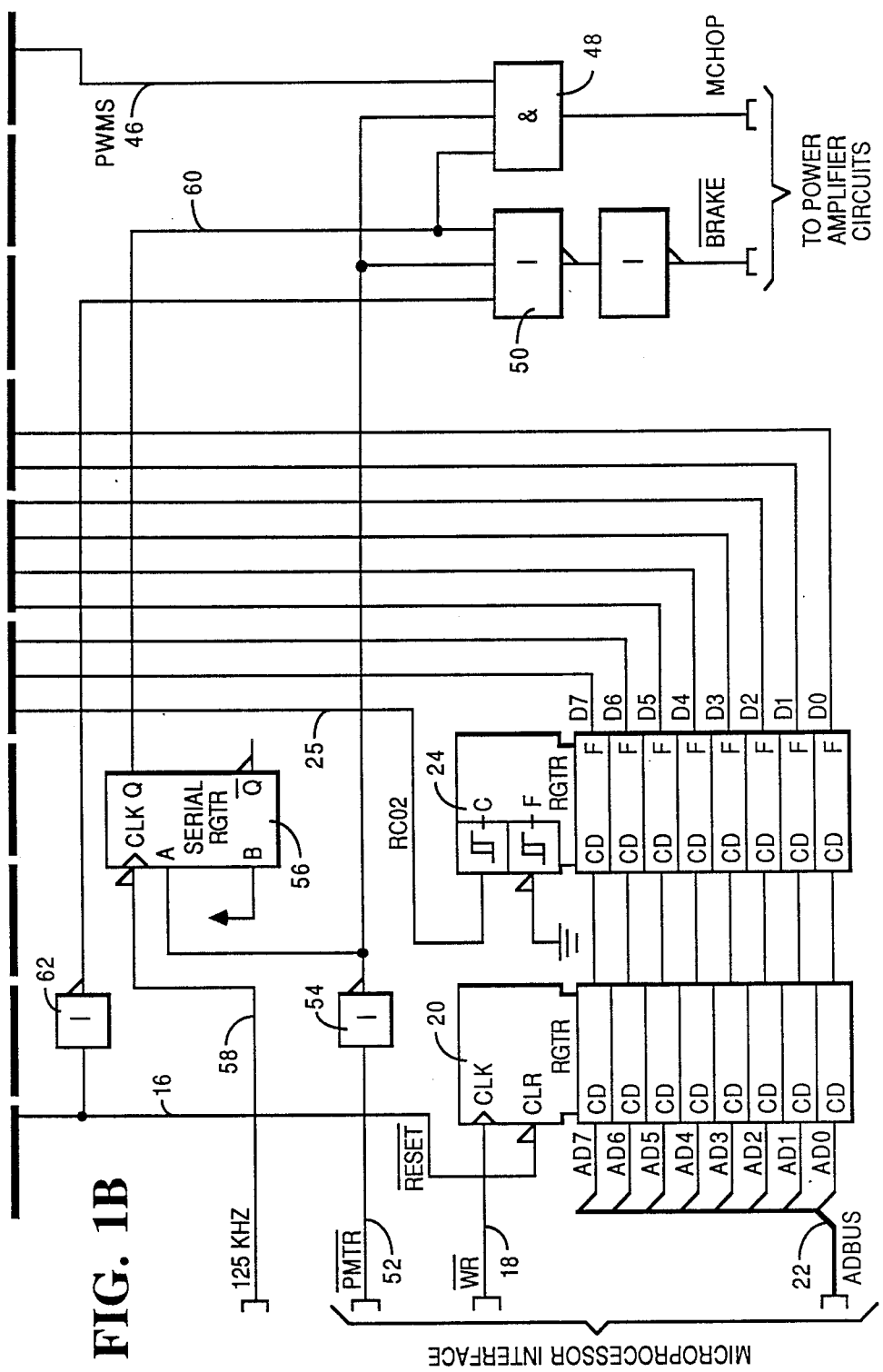

Referring now to FIGS. 1A and 1B, shown there is a storage device 20, which may be an octal D flip-flop with clear, of type 74LS273. It should be noted that all of the semiconductor devices described in this application may be acquired, for example, from Texas Instruments Incorporated, Dallas, Tex. It will be understood that for greater economy and efficiency, the various components described herein can also be implemented in the form of large scale integration, preferably together with other associated motor circuit control components.

The storage device or octal D flip-flop 20 has its eight inputs connected to individual lines in a bus 22, designated as ADBUS in FIG. 1B, said lines being designated AD0-AD7, respectively, to receive motor drive control data from an associated microprocessor, represented in FIG. 1B by the microprocessor interface 14. Most DC motors operating in a microprocessor environment have encoded DC motor shaft velocity, torque control or position signals as microprocessor input. The microprocessor utilizes a program control algorithm and is provided with circuitry for control of the applied DC motor voltage from the microprocessor. Control of the applied DC motor voltage may be by pulse width modulation. The data which appears on the ADBUS lines provides the relative power-on and power-off "chopping" portions of a complete pulse applied to the power amplifier circuits of the DC motor drive. A clock input of the octal D flip-flop 20 is connected to a WR/ line 18 and a clear input of the storage device 20 is connected to a RESET line 16.

The eight outputs of the octal D flip-flop 20 are coupled to the corresponding inputs of a latch 24, which may be an octal D transparent latch with tristate outputs, of type 74LS373. An "F" input of the latch 24 is connected to ground, and a clock input is connected to a line 25 carrying a ripple carry signal RC02 (FIG. 2), which will be subsequently described in greater detail. The outputs D0-D3 and D4-D7, respectively, of the latch 24 are coupled to inputs B0-B3, respectively, of two interconnected comparators 26 and 28, each of which may be a four-bit magnitude comparator of type 74LS85.

The two comparators 26 and 28 are interconnected by interconnections 30 and functionally constitute a single eight-bit magnitude comparator having A<B output signal (FIG. 2) appearing on a line 32. Inputs A0-A3, respectively, of the comparators 26 and 28 are coupled to outputs C0 to C3 and C4 to C7 (FIG. 2) of two synchronous four-bit binary counters 36 and 34, which may be of type 74LS161. The two counters 34 and 36 are interconnected by a line 38 on which a ripple carry signal RC01 appears. These two counters functionally constitute a single eight-bit counter having the previously mentioned ripple carry signal RC02 as one output. A 2-MHZ clock signal (FIG. 2) is applied on line 40 to the counters 34 and 36, and a reset signal RESET/ is applied on line 16 to the CLR/ input of the counters 34 and 36. The potential connections and ground connections for the counters 34 and 36 are shown in FIG. 1A.

Returning to the output line 32 carrying the A<B signal from the comparator 28, this is applied to one input of a flip-flop 42 which performs a signal-shifting function, and which may be of type 74LS74. The RESET/ line 16 is applied to the reset input of the flip-flop 42. The 2-MHZ clock on line 40 is inverted by an inverting buffer 44, which may be of type 74LS04, and is applied from the output of said buffer to the clock input of the flip-flop 42.

The output signal PWMS (FIGS. 2, 3A and 3B) from the flip-flop 42 is applied over a line 46 to one input of a three-input AND gate 48. The gate 48, together with a second gate 50, which may be a three-input NOR gate, and an associated inverting buffer 51, provide signals for driving and braking of an electric motor which may be used, for example, for operating the movable carriage of a printer, such as a dot matrix printer. As indicated in FIG. 1B, these signals MCHOP (FIGS. 3A and 3B) and BRAKE/ (FIGS. 3A and 3B), are applied to power amplifier circuits associated with the motor.

The gate 48, in the illustrated embodiment, may be of type 74LS11 and provides at its output the signal designated MCHOP which is used in driving the motor, and which may vary in duration in order to adjust the motor shaft speed for constant angular velocity.

The NOR gate 50, which may be of type 74LS27, together with the inverting buffer 51, which may be of type 74LS04, in the illustrated embodiment, provides at the output of said inverting buffer the signal designated BRAKE/ which is used in causing the motor to halt its rotation.

A second input to the gate 48 is derived from the processor motor signal PMTR/ (FIGS. 3A and 3B) which appears on a line 52, is inverted by an inverting buffer 54, which may be of type 74LS04, and in its inverted form is applied to both of the gates 48 and 50. The inverted signal PMTR/ is also applied to one input of an eight-bit serial register 56, which may be of type 74LS91. A 125-KHZ clock signal (FIGS. 3A and 3B) is also applied to the register 56 over a line 58. Transitions of the signals PMTR/ are delayed eight clock periods of the 125-KHZ clock and appear as a signal Q (FIGS. 3A and 3B) on the output line 60. This delayed signal is applied to one input of each of the gates 48 and 50, and ensures that the MCHOP signal is inactive (0 volts) for 8-125 KHZ clock periods prior to the BRAKE/ signal becoming active (0 volts), and that the BRAKE/ signal is inactive (+5 volts) for 8-125 KHZ clock periods prior to the MCHOP signal becoming active ("chopping").

A third input to the gate 50 is provided by the RESET/ signal on line 16, which is inverted by an inverting buffer 62, which may be of type 74LS04.

The operation of the system of FIGS. 1A and 1B will now be described. In order to aid in an understanding of the operation of this system, reference may be had to the waveforms shown in FIGS. 2, 3A and 3B. It will be seen that the designations of the various waveforms appear at the left of FIGS. 2 and 3A. In this explanation, it will be assumed that a hexadecimal value of 84H, representing 132 counts of the 2-MHZ clock signal, has been latched into the octal flip-flop 20 by the ADBUS and WR/ signals.

In the system of FIGS. 1A and 1B, the counter comprised of individual counters 34 and 36 changes its state on the rising edge of the 2-MHZ clock. Consequently, the rising edge of the ripple counter output signal RC02 is timed to coincide with a rising edge of the 2-MHZ clock signals as may be seen in FIG. 2. When outputs C0-C7 are all high, the counter has reached its maximum count of 256, and the ripple counter output signal RC02 is at a high logic level. This causes the contents of the octal D flip-flop 20 to be latched into the latch 24, and to be applied to the "B" inputs of the comparators 26 and 28.

When the next rising edge of the 2-MHZ clock is received, the counter rolls over to 0, the signal RC02 falls to its low logic level and all of the signals C0-C7 go to their low logic level. These signal levels are applied to the "A" inputs of comparator 26 and 28. Therefore, at this time, the "B" input count of said comparator is greater than the "A" input count, and the A<B signal is at a high logic level. The A<B signal is applied to an input of the flip-flop 42 over the line 32, and the flip-flop is clocked by the 2-MHZ clock signal as inverted by the inverting buffer 44. It will be seen that the PWMS signal output from the flip-flop 42 is identical to the A<B signal of the line 32, and is therefore at a high logic level, but is shifted one half of the 2-MHZ clock cycle by the inverting buffer 44. This is done to avoid switching noise of the signal PWMS, which noise may be created during state transitions in the comparators 26 and 28.

For every rising edge of the 2-MHZ clock pulse after the signal PWMS goes to a high logic level, the combined counters 34, 36 increase their count, until at 132 counts in the illustrated embodiment, the output of said counters applied to the "A" inputs of the comparators 26, 28 becomes equal to the value applied to the "B" inputs from the latch 24. At this time, the signal A<B shifts to a low logic level and on the next falling edge of the 2-MHZ clock, as inverted by the inverting buffer 44 and applied to the flip-flop 42, the signal PWMS shifts to a low logic level.

The counters 34, 36 continue to be incremented by the 2-MHZ clock signals for another 124 counts until the combined counters reach their total capacity of 256 counts, at which time the signal RC02 goes to a high logic level once again. If the input to the octal D flip-flop 20 from the ADBUS line 22 is still 84H, the signal PWMS will have the same high and low logic level durations as before. If a new input of different value has been applied to the octal D flip-flop 20 via the lines 18 and 22, the high and low logic level durations of the signal PWMS will be altered accordingly.

As previously noted, and referring to FIGS. 3A and 3B, the signal PWMS is one of three signals applied to inputs of the gate 48 to produce an MCHOP output signal. The other two signals are derived from the processor motor signal PMTR/, with one of said signals being inverted by the inverting buffer 54, and the other of said signals also being inverted by the inverting buffer 54 and then being delayed by the serial register 56 before being applied to the gate 48. The signal PWTR/ initiates the MCHOP signal in response to the control of the microprocessor, but the actual commencement of the MCHOP signal is delayed by the eight counts of the 125 KHZ clock required for the signal PMTR/ to pass through the register 56 to its Q output, line 60. This prevents a possible overlap in signals BRAKE/ and MCHOP, which could result in destructive current spikes.

In a similar manner, this signal BRAKE/ is produced by the gate 50 and inverted by the inverting buffer 51, in accordance with the inverse signal PMTR/, the output signal Q on line 60 from register 56, and the inverse of the RESET/ signal taken from the inverting buffer 62. In this instance also, the BRAKE/ signal is delayed by the eight counts of the 125 KHZ clock required for the signal PMTR/ to pass through the register 56 to its Q output, line 60, in order to prevent a possible overlap in the signals BRAKE/ and MCHOP.

While the form of the invention illustrated and described herein is admirably adapted to fulfill the objects aforesaid, it is to be understood that other and further modifications within the scope of the appended claims may be made without departing from the spirit of the invention.

What is claimed is:

1. A digital motor control system comprising:
   clock signal means;
   storage means for receiving digital motor operation data;
   latch means coupled to said storage means for receiving and retaining said digital motor operation data;
   counter means controlled by said clock signal means for counting incrementally from a first digital value to a second digital value and then returning to said first digital value;
   digital comparator means coupled to said latch means and to said counter means for comparing the digital value of data stored in said latch means with the digital value stored in said counter means and for providing an output signal on an output thereof when a predetermined relationship occurs between said latch means data value and said counter value;
   shift means coupled to said clock signal means and said comparator means for time-shifting the output signal from the comparator means;
   microprocessor means for producing a motor drive signal;
   motor drive control means coupled to said microprocessor means;
   reset control means;
   delay means coupled to said motor drive control means for producing a delayed output signal;
   first gating means coupled to said shift means, said motor drive control means, and said delay means for controlling said motor drive control signal; and
   second gating means coupled to said reset control means, said motor drive control means, and said delay means for producing a brake signal which is delayed a predetermined amount in commencing until after a preceding motor drive signal has terminated, said motor drive signal being delayed a predetermined amount in commencing until after a preceding brake signal has terminated.

2. The digital motor control system of claim 1 in which said first gating means comprises a three-input AND gate.

3. The digital motor control system of claim 1 in which said second gating means comprises a three-input NOR gate and an inverting buffer.

4. The digital motor control system of claim 1 in which said shift means comprises an inverting buffer for providing an inverted clock signal and a flip-flop having inputs coupled to said inverting buffer and to the output of said comparator means.

5. The digital motor control system of claim 1 in which said delay means comprises a serial shift register.

6. The digital motor control system of claim 5 in which said serial shift register is an eight-bit serial shift register.

7. The digital motor control system of claim 1 in which said counter means is provided with a ripple carry output coupled to said latch means for controlling the operation of said latch means.

8. The digital control system of claim 1 in which said counter means comprises a plurality of interconnected counters.

9. The digital motor control system of claim 1 in which said comparator means comprises a plurality of interconnected magnitude comparators.

10. The digital motor control system of claim 1 in which said reset control signal input means is also coupled to said register means and said counter means.

11. The digital motor control system of claim 1 in which said storage means is an octal flip-flop.

12. The digital motor control system of claim 1 in which the predetermined relationship comprises the latch means data value equaling the counter means value.

13. A digital motor control system comprising:
clock signal means;
a first flip-flop for receiving digital motor operation data;
latch means coupled to said first flip-flop for receiving and retaining said digital motor operation data;
counter means controlled by said clock signal means for counting incrementally from a first digital value to a second digital value and then returning to said first digital value;
digital comparator means coupled to said latch means and to said counter means for comparing the digital value of data stored in said latch means with the digital value stored in said counter means and for providing an output signal on an output thereof when the value stored in said latch means equals the value in said counter means;
shift means comprising a first inverting buffer coupled to said clock signal means for providing an inverted clock signal and a second flip-flop having inputs coupled to said first inverting buffer and to the output of said comparator means for time-shifting the output signal from the comparator means;
microprocessor means for producing a motor drive signal;
motor drive control means coupled to said microprocessor means;
reset control means;
a serial shift register coupled to said motor drive control means for producing a delayed output signal;
first gating means comprising a three-input AND gate coupled to said shift means, said motor drive control means, and said delay means for producing a motor drive signal; and
second gating means comprising a three-input NOR gate coupled to said reset control means, said motor drive control means, and said delay means and a second inverting buffer coupled to the output of said NOR gate for producing a brake signal which is delayed a predetermined amount in commencing until after a preceding motor drive signal has terminated, said motor drive signal being delayed a predetermined amount in commencing until after a preceding brake signal has terminated.

14. The digital motor control system of claim 13, also including a second clock signal means coupled to said serial shift register for driving it.

* * * * *